3,781,270
SUBSTITUTED METHANO DIBENZAZOCINES AND DIBENZAZONINES
William J. Houlihan, Baden, Austria, and Jeffrey Nadelson, Parsippany, N.J., assignors to Sandoz-Wander, Inc., Hanover, N.J.
No Drawing. Filed Sept. 13, 1971, Ser. No. 180,128
Int. Cl. C07d 41/00
U.S. Cl. 260—239 BB         3 Claims

ABSTRACT OF THE DISCLOSURE

Dibenz[c,f] azocines and dibenz[c,g] azonines, e.g. 5,12-dihydro - 6 - methyl-5,12-methano-6H-dibenz[c,f] azonines. More partciularly, it relates to substituted me-methano-5H-dibenz[c,g] azonine hydrochloride are prepared by reducing a corresponding azocinone or azoninone and are useful as anti-depressant agents.

---

This invention relates to dibenzazocines and dibenzazonines. More particularly, it relates to substituted methano dibenzazocines and substituted methano dibenzazonines. The invention also relates to intermediates for said compounds, to acid addition salts thereof, and to processes for their preparation.

The compounds of this invention may be represented by the following structural formula:

(I)

wherein $n$ represents 0 or 1;
$R^1$ represents hydrogen, halo having an atomic weight of 19 to 36, trifluoromethyl, straight chain lower alkyl having 1 to 4 carbon atoms, e.g., methyl, ethyl, propyl, and the like, or straight chain lower alkoxy having 1 to 4 carbon atoms, e.g., methoxy, ethoxy and the like; and
$R^2$ represents straight chain lower alkyl having 1 to 4 carbon atoms, e.g., methyl, ethyl or propyl.

The process of preparing the compounds of the Formula I may be represented by the following reaction scheme:

(II) → (I)

wherein $n$, $R^1$ and $R^2$ are as previously defined.

The compounds of Formula I are prepared by treating a compound of the Formula II with lithium aluminum hydride in an inert solvent such as the hydrocarbons, e.g., hexane, heptane, benzene, toluene or the ethers such as diethyl ether or tetrahydrofuran, the latter being preferred. The reaction temperature is from about 0° to 100° C., preferably reflux temperature of solvent. The reaction time may vary and is usually in the range of 1–5 hours.

The compounds of the Formula II are obtainable by the following reaction scheme:

(III) → (II)

where $n$, $R^1$ and $R^2$ are as previously defined.

The compounds of the Formula II are prepared by cyclizing a compound of the Formula III or an acid addition salt thereof, such as a strong mineral acid addition salt, in the presence of dicyclohexylcarbodiimide. Although the particular solvent used is not critical, hydrocarbon solvents such as hexane, heptane, benzene, etc. and pyridines are preferred, especially pyridine. The reaction temperature is from about 20° to 100° C., preferably from about 20° to 30° C. The reaction time may vary widely and is usually in the range of from about 2–6 days.

The compounds of the Formula III are obtainable by the following reaction scheme:

(IV) → (III)

wherein $n$, $R^1$ and $R^2$ are as previously defined. $C_5H_6$ represents phenyl in the specification and claims.

The compounds of Formula III are prepared by reducing a compound of the Formula IV or an acid addition salt thereof, such as a strong mineral acid addition salt. The reduction is carried out using conventional techniques, e.g. alkali metal reducing agent, platinum, or hydrogenation with a palladium catalyst, the latter being preferred. Although the particular solvent used is not critical the lower alkanols such as methanol, ethanol and the like are preferred. The reaction temperature is from about 20° to 80° C., preferably from about 20° to 30° C. The reaction time may vary widely but the reaction may normally be terminated when two equivalents of hydrogen are absorbed.

The compounds of Formula IV are prepared as indicated by the follow reaction scheme:

(V) → (IV)

wherein $n$, $R^1$ and $R^2$ are as previously defined.

The compounds of Formula IV are prepared by heating a compound of Formula V optionally in inert solvents such as the ethers, e.g., ethyl ether or tetrahydrofuran, hydrocarbon or halogenated hydrocarbon such as hexane, heptane, benzene, toluene, o-dichlorobenzene and the like, at about 100°–220°C., preferably 140°–160° C. for about 15 to 48 hours, preferably 20 to 28 hours. The temperatures and times are not critical. To improve yields and obtain a better quality product, the reaction may be performed under inert atmosphere, e.g., nitrogen gas.

The compounds of Formula V are prepared as indicated by the following reaction scheme:

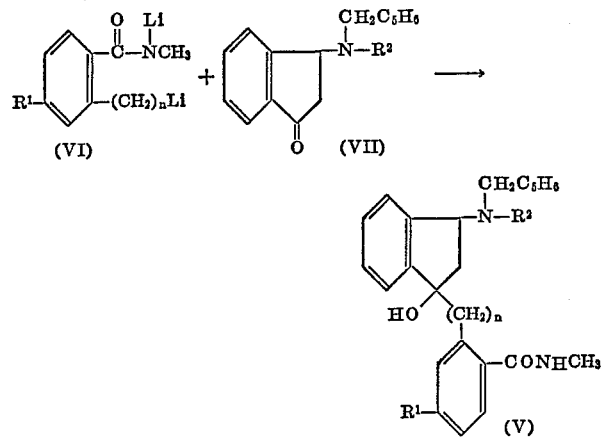

wherein $n$, $R^1$ and $R^2$ are as previously defined.

The compounds of Formula V are prepared by condensing a compound of Formula VI with a compound of Formula VII in the presence of an inert atmosphere, e.g., nitrogen gas, in an inert solvent such as diethyl ether, tetrahydrofuran, hexane, heptane, benzene and the like or mixtures thereof, and subjecting the reaction mixture to hydrolysis, preferably with aqueous ammonium chloride. The condensation may be carried out at a temperature of from about −60° C. to 0° C., preferably −60° to −40° C. for about 1 to 3 hours. The hydrolysis is performed in a conventional manner at a temperature of about −20° to 0° C. Neither temperatures, solvents nor hydrolyzing agents are critical. Compound VI is preferably added in an inert solvent to a cold (−60° to −40° C.) solution of Compound VII.

Conventional techniques may be used to recover all the final products in the above-mentioned processes, e.g., recrystallization, filtration, etc.

Certain of the Compounds VI and VII are known and may be prepared by methods disclosed in the literature. The compounds VI and VII not specifically disclosed may be prepared by analogous methods from known materials.

The compounds of Formula I are useful because they possess pharmacological activity in animals. More particularly, the compounds possess central nervous system stimulant activity and are useful as antidepressants as indicated by their activity in the mouse given parenterally 10.2 mg./kg. to 23.5 mg./kg. of body weight of active material. The test method used is basically as described by Spencer, P. S. J., Antagonism of Hypothermia in the Mouse by Anti-Depressants, in Anti-Depressant Drugs, pp. 194–204, Eds. S. Garattini and M. N. G. Dukes, Excerpta Medica Foundation.

For such usage, the compounds of Formula I may be combined with a pharmaceuticaly acceptable carrier or adjuvant, and may be administered orally in such forms as tablets, capsules, elixirs, suspensions and the like, or parenterally in the form of an injectable solution or suspension. The dosage will vary depending upon the mode of administration utilized and the particular compound employed.

These compounds of Formula I may be similarly administered in the form of their non-toxic pharmaceutically acceptable acid addition salts. Such salts possess the same order of activity as the free base, and are readily prepared by reacting the base with an appropriate acid and accordingly, are included within the scope of the invention. Representative of such salts are the mineral acid salts, such as hydrochloride, hydrobromide, sulfate, phosphate and the like and the organic salts, such as succinate, benzoate, acetate, p-toluenesulfonate, benzenesulfonate and the like.

In general, satisfactory results for anti-depressant activity is obtained when the compounds are administered at a daily dosage of from about 1 to 100 milligrams per kilogram of animal body weight. This daily dosage is preferably given in divided doses, e.g., 2 to 4 times a day, or in sustained release form. For most large animals, the total daily dosage is from about 75 to 100 milligrams and dosage forms suitable for internal administration comprise from about 20 to 500 milligrams of the compound in admixture with a solid or liquid pharmaceutical carrier or diluent.

A representative formulation suitable for oral administration is a tablet prepared by standard tabletting techniques which contains the following:

| Ingredients | Weight (mg.) Tablet | Capsule |
|---|---|---|
| 5,12-dihydro-6-methyl-5,12-methano-6H-dibenz[c, f]azocine hydrochloride | 250 | 250 |
| Tragacanth | 10 | |
| Lactose | 197.5 | 250 |
| Corn starch | 25 | |
| Talcum | 15 | |
| Magnesium stearate | 2.5 | |

The following pharmaceutical compositions are formulated with the indicated amount of active agent using conventional techniques. The injectable solution and the oral liquid solution represent formulations useful in the treatment of depression:

| Weight percent of | Injectable | Liquid |
|---|---|---|
| 5,12-dihydro-6-methyl-5,12-methano-6H-dibenz[c, f]azocine hydrochloride | 10 | 0.5–3.5 |
| Sodium alginate | 0.5 | |
| Sodium benzoate | | 0.1–0.5 |
| Simple syrup | | 30–70 |
| Lecithin | 0.5 | |
| Sodium chloride | (1) | |
| Flavor | | (1) |
| Color | | (1) |
| Sorbitol solution 70% USP | | 10–30 |
| Buffer agent to adjust pH for desired stability | (1) | (1) |
| Water | (2) | (2) |

[1] As desired.
[2] To desired volume.

EXAMPLE 1

α-(3-methylbenzylamino-1-hydroxy-indan-1-yl)-N-methyl-o-toluamide

To a flask equipped with a stirrer, dropping funnel, condenser and gas inlet tube maintained under a nitrogen atmosphere there is added at room temperature 40.0 g. (0.28 mole) of N-methyl-o-toluamide and 250 ml. of anhydrous tetrahydrofuran. The reaction flask is immersed in an ice bath and cooled to an internal temperature of 5° C. Stirring is initiated and 380 ml. of 1.6 M n-butyllithium (0.616 mole) in hexane is added dropwise in ca. 1 hour maintaining the temperature below 8° C. The resulting red dilithio salt is stirred at 5° C. for 1 additional hour and the reaction flask is then immersed in a Dry-Ice acetone bath and cooled to an internal temperature of −60° C. To the cold reaction mixture a solution of 70.3 g. (0.28 mole) 3-(benzylmethylamino)-1-indanone in 140 ml. of anhydrous tetrahydrofuran is added dropwise in ca. 45 minutes maintaining the temperature between −60° C. and −50° C. The resulting reaction mixture is stirred at −60° C. for 1 hour, allowed to warm to 0° C. in ca. 1 hour, and then treated, with 200 ml. of saturated aqueous ammonium chloride while maintaining the temperature below 10° C. The resulting two layers are separated and the tetrahydrofuran layer is dried over magnesium sulfate, filtered and evaporated. The residue is chromatographed on silica gel with benzene:ethylacetate (1:1) to provide α-(3-methylbenzylamino-1-hydroxy-indan-1-yl)-N-methyl-o-toluamide. Following the above procedure and using an equivalent amount of N-methyl-4-chloro-2-methylbenzamide;
N-methyl-4-trifluoromethyl-2-methylbenzamide; or
N-methyl-4-methyl-2-methylbenzamide in place of N-methyl-o-toluamide there is obtained α-(3-methylbenzylamino-1-hydroxy-indan-1-yl)-N-methyl-4-chloro-2-methylbenzamide;
α-(3-methylbenzylamino-1-hydroxy-indan-1-yl)-N-methyl-4-trifluoromethyl-2-methylbenzamide; or
α-(3-methylbenzylamino-1-hydroxy-indan-1-yl)-N-methyl-4-methyl-2-methylbenzamide respectively.

EXAMPLE 2 o-(3-methylbenzylamino-1-hydroxy-indan-1-yl)-N-methyl benzamide

To a flask equipped with a stirrer, dropping funnel, condenser and gas inlet tube maintained under a nitrogen atmosphere there is added at room temperature 37.8 g. (0.28 mole) of N-methyl-benzamide and 250 ml. of anhydrous tetrahydrofuran. The reaction flask is immersed in an ice bath and cooled to an internal temperature of 5° C. Stirring is initiated and 380 ml. of 1.6 M n-butyl-lithium (0.616 mole) in hexane is added dropwise in ca. 1 hour maintaining the temperature below 8° C. The resulting red dilithio salt is stirred at 5° C. for 1 additional hour and the reaction flask is then immersed in a Dry-Ice acetone bath and cooled to an internal temperature of −60° C. To the cold reaction mixture a solution of 70.3 g. (0.28 mole) of 3-(benzylmethylamino)-1-indanone in 140 ml. of anhydrous tetrahydrofuran is added dropwise in ca. 45 minutes maintaining the temperature between −60° C. and −50° C. The resulting reaction mixture is stirred at −60° C. for 1 hour, allowed to warm to 0° C. in ca. 1 hour, and then treated with 200 ml. of saturated aqueous ammonium chloride while maintaining the temperature below 10° C. The resulting two layers are separated and the tetrahydrofuran layer is dried over magnesium sulfate, filtered and evaporated. The residue is chromatographed on silica gel with benzene:ethylacetate (1:1) to provide o-(3-methylbenzylamino-1-hydroxy-indan-1-yl)-N-methyl benzamide.

Following the above procedure and using an equivalent amount of

N-methyl-4-chloro-benzamide;
N-methyl-4-trifluoromethyl-benzamide; or
N-methyl-4-methylbenzamide in place of N-methyl-benzamide there is obtained o-(3-methylbenzylamino-1-hydroxy-indan-1-yl)-N-methyl-4-chlorobenzamide;
o-(3-methylbenzylamino-1-hydroxy-indan-1-yl)-N-methyl-4-trifluoromethyl-benzamide; or
o-(3-methylbenzylamino-1-hydroxy-indan-1-yl)-N-methyl-4-methylbenzamide respectively.

EXAMPLE 3

3-methylbenzylamino-spiro[indan-1,3′-isochroma]-1′-one

To a flask equipped with a stirrer, condenser and gas inlet tube maintained under a nitrogen atmosphere there is added at room temperature 20 g. (0.05 mole) of α-(3-methylbenzylamino - 1-hydroxy-indan-yl)-N-methyl-o-toluamide and 170 ml. of o-dichloro benzene. Stirring is initiated and the mixture is heated at reflux for 18 hours. The excess o-dichlorobenzene is then removed by distillation in vacuo and the resulting oil is recrystallized from hot ethyl acetate to give 3-methylbenzylaminospiro[indan-1,3′-isochroman]-1′-one; (M.P. 224°–225° C. as hydrochloride salts).

Following the above procedure and using an equivalent amount of

α-(3-methylbenzylamino-1-hydroxy-indan-1-yl)-N-methyl-4-chloro-2-methylbenzamide;
α-(3-methylbenzylamino-1-hydroxy-indan-1-yl)-N-methyl-4-trifluoromethyl-2-methylbenzamide; or
α-(3-methylbenzylamino-1-hydroxyindan-1-yl)-N-methyl-4-methyl-2-methylbenzamide in place of α-(3-methylbenzylamino-1-hydroxy-indan-1-yl)-N-methyl-o-toluamide there is obtained 3-methylbenzylamino-spiro[6′-chloroindan-1,3′-isochroman]-1′-one;
3-methylbenzylamino spiro[6′-trifluoromethylindan-1,3′-isochroman]-1′-one; or
3-methylbenzylamino-spiro[6′-methyl indan-1-3′-isochroman]-1′-one, respectively.

EXAMPLE 4

3-methylbenzylamino-spiro[indan-1,3′-phthalan]-1′-one

To a flask equipped with stirrer, condenser and gas inlet tube maintained under a nitrogen atmosphere there is added at room temperature 19.3 g. (0.05 mole) of o-(3-methylbenzylamino - 1-hydroxy-indan-yl)-N-methylbenzamide and 170 ml. of O-dichlorobenzene. Stirring is initiated and the mixture is heated at reflux for 18 hours. The excess o-dichlorobenzene is then removed by distillation in vacuo and the resulting oil is recrystallized from hot ethyl acetate to give 3-methylbenzylaminospiro[indan-1,3-phthalen]-1′-one (M.P. 164–170° C. as hydrochloride salt).

Following the above procedure and using an equivalent amount of o-(3-methylbenzylamino-1-hydroxy-indan-1-yl)-N-methyl-4-chlorobenzamide;
o-(3-methylbenzylamino-1-hydroxy-indan-1-yl)-N-methyl-4-trifluoromethylbenzamide; or
o-(3-methylbenazylamino-1-hydroxy-indan-1-yl)-N-methyl-4-methylbenzamide in place of o-(3-methylbenzylamino-1-hydroxy-indan-1-yl)-N-methylbenzamide there is obtained 3-methylbenzylamino-spiro[6′-chloroindan-1,3′-phthalan]-1′-one;
3-methylbenzylamino-spiro[6′-trifluoromethylindan-1,3′-phthalan]-1′-one; or
3-methylbenzylamino-spiro[6′-methylindan-1,3′-phthalan]-1′-one, respectively.

EXAMPLE 5 o-(3-methylamino-indan-1-yl)-benzoic acid hydrochloride

A mixture of 20.5 g. (0.05 mole) 3-methylbenzylamino-spiro[indan-1,3′-phthalan]-1′-one hydrochloride, 350 ml. ethanol, 3.1 g. 10% palladium catalyst and 0.5 ml. concentrated hydrochloric acid is hydrogenated at 50 p.s.i. and room temperature until 2 equivalents of $H_2$ are absorbed. The catalyst is filtered and triturated thoroughly with hot methanol and the combined filtrates evaporated to dryness and the crystalline residue recrystallized from hot ethanol to give o-(3-methylamino-indan-1-yl)-benzoic acid hydrochloride, M.P. 270°–271.5° C.

Following the above procedure and using an equivalent amount of the hydrochloride salt of 3-methylbenzylamino-spiro[6′-chloroindan-1,3′-phthalan]-1′-one;
3-methylbenzylamino-spiro[6′-trifluoromethyl 1,3′-phthalan]-1′-one; or
3-methylbenzylamino-spiro[6′-methylindan-1,3′-phthalan]-1′-one in place of 3-methylbenzylamino-spiro[indan-1,3'-phathalan]-1'-one hydrochloride there is obtained 2-(3-methylamino-indan-1-yl)-4-chlorobenzoic acid hydrochloride;
2-(3-methylamino-indan-1-yl)-4-trifluoromethyl benzoic acid hydrochloride; or
2-(3-methylamino-indan-1-yl)-4-methyl benzoic acid hydrochloride, respectively.

EXAMPLE 6

Following the procedure of Example 5 and using 3-methylbenzylamino-spiro[indan - 1,3'-isochroman]-1'-one in place of 3 - methylbenzylamino-spiro[indan - 1,3'-phthalan]-1'-one hydrochloride, there is obtained α-(3-methylamino-indan-1-yl)-o-toluic acid hydrochloride M.P. 250–251° C.

When an equivalent amount of a hydrochloride salt of 3-methylbenzylamino-spiro[6'-chloro-indan-1,3'-isochroman]-1'-one;
3-methylbenzylamino-spiro[6'-trifluoromethyl-indan-1,3'-isochroman]-1'-one; or
3-methylbenzylamino-spiro[6'-methyl-indan-1,3'-isochroman]-1'-one in place of 3-methylbenzylamino-spiro[indan-1,3'-isochroman]-1'-one, there is obtained α-(3-methylamino-indan-1-yl)-4-chloro-2-methyl-benzoic acid hydrochloride;
α-(3-methylamino-indan-1-yl)-4-trifluoromethyl-2-benzoic acid hydrochloride; or
α-(3-methylamino-indan-1-yl)-2,4-dimethyl benzoic acid hydrochloride, respectively.

EXAMPLE 7

5,12-dihydro-6-methyl-5,12-methano-dibenz[c,f]azocin-7(6H)-one

A solution of 12.1 g. (0.04 mole) o-(3-methylamino-indan-1-yl) benzoic acid hydrochloride in 300 ml. anhydrous pyridine is warmed to 60° and treated with 8.7 g. dicyclohexylcarbodimide (0.043 mole) in 25 ml. pyridine. The resulting solution is stirred at room temperature for 4 days. The resulting suspension is filtered and the solvent evaporated in vacuo, the residue is triturated with chloroform and filtered. The chloroform is washed with 2 N hydrochloric acid (100 ml.) and the saturated sodium bicarbonate (100 ml.) dried over magnesium sulfate and evaporated in vacuo to give 5,12-dihydro-6-methyl-5,12-methano-dibenz[c,f]azocin-7(6H)-one; M.P. 156.5° to 158° C.

Following the above procedure and using an equivalent amount of 2-(3-methylamino-indan-1-yl)-4-chlorobenzoic acid hydrochloride;
2-(3-methylamino-indan-1-yl)-4-trifluoromethyl benzoic acid hydrochloride; or
2-(3-methylamino-indan-1-yl)-4-methyl benzoic acid hydrochloride in place of O-(3-methylamino-indan-1-yl) benzoic acid hydrochloride there is obtained 10-chloro-5,12-dihydro-6-methyl-5,12-methano-dibenz[c,f]azonin-7(6H)-one;
5,12-dihydro-6-methyl-5,12-methane-10-trifluoromethyl-dibenz[c,f]azocin-7(6H)-one; or
5,12-dihydro-6,10-dimethyl-5,12-methano-dibenz[c,f]azocin-7(6H)-one, respectively.

EXAMPLE 8

Following the procedure of Example 7 and using an equivalent amount of α-(3-methylamino-indan-1-yl)-toluic acid hydrochloride in place of o-(3-methylamino-indan-1-yl)-benzoic acid hydrochloride, there is obtained 5,13-dihydro - 6 - methyl-5,13-methano-dibenz[c,g]-azonin-(5H)-one.

When an equivalent amount of

α-(3-methylamino-indan-1-yl)-4-chloro-2-methyl benzoic acid hydrochloride;
α-(3-methylamino-indan-1-yl)-4-trifluoromethyl-2-methylbenzoic acid hydrochloride; or
α-(3-methylamino-indan-1-yl)-2,4-dimethyl benzoic acid hydrochloride is used in place of α-(3-methylamino-indan-1-yl)-toluic acid hydrochloride there is obtained 10-chloro-5,13-dihydro-6-methyl-5,13-methano-dibenz-[c,g]-azonin-7(5H)-one;
5,13-dihydro-6-methyl-5,13-methano-10-trifluoromethyl-dibenz[c,g]-azonin-7(5H)-one; or
5,13-dihydro-6-methyl-5,13-methano-10-methyl-dibenz-[c,g]-azonin-7(5H)-one, respectively.

EXAMPLE 9

5-12-dihydro-6-methyl-5,12-methano-6H-dibenz[c,f]azocine hydrochloride

To a suspension of 1.4 g. lithium aluminum hydride and 100 ml. dry tetrahydrofuran is added, under $N_2$, with stirring at room temperature a solution of 9.0 g. (0.036 mole) 5,12 - dihydro-6-methyl-5,12-methano-dibenz[c,f] azocin-7(6H)-one dropwise for about 1 hour. After the addition is complete the mixture is refluxed for 2 hours, then cooled in ice and treated with 50 ml. ethyl acetate, followed by 10 ml. water and dried with magnesium sulfate. The mixture is filtered and the solvents evaporated in vacuo. The resulting residue is dissolved in ethanol and treated with gaseous hydrochloride, the solvent is evaporated and the crystalline residue is recrystallized from chloroform to give 5,12-dihydro-6-methyl-5,12-methano-6H-dibenz[c,f]azocine hydrochloride; M.P. 237–239° C.

Following the above procedure and using an equivalent amount of 10-chloro-5,12-dihydro-6-methyl-5,12-methano-dibenzo-[c,f]azocine-7(6H)-one;
5,12-dihydro-6-methyl-5,12-methano-10-trifluoromethyl-dibenz[c,f]azocine-7(6H)-one; or
5,12-dihydro-6,10-dimethyl-5,12-methano-dibenz[c,f]azocin-7(6H)-one, in place of 5,12 - dihydro-6-methyl-5,12-methano-dibenzo-[c,f]azocin-7(6H)-one there is obtained 10-chloro-5,12-dihydro-6-methyl-5,12-methano-6H-dibenz-[c,f]azocine hydrochloride;
5,12-dihydro-6-methyl-5,12-methano-10-trifluoro methyl-6H-dibenz[c,f]azocine hydrochloride; or
5,12-dihydro-6,10-dimethyl-5,12-methano-6H-dibenz-[c,f]azocine hydrochloride, respectively.

EXAMPLE 10

Following the procedure of Example 9 and using an equivalent amount of 5,13-dihydro-6-methyl-5,13-methano-dibenz[c,g]azonin-7(5H)-one in place of 5,12-dihydro - 6-methyl-5,12-methano-dibenz[c,f]-7(6H)-one there is obtained 5,13 - dihydro-6-methyl-5,13-methano-5H-dibenz[c,g]azonine hydrochloride.

Following the above procedure and using an equivalent amount of 10-chloro-5,13-dihydro-6-methyl-5,13-methane-dibenz-[c,g]azonin-7(5H)-one;
5,13-dihydro-6-methyl-5,13-methano-10-trifluoromethyl-dibenz[c,g]-azonin-7(5H) one; or
5,13-dihydro 6,10-dimethyl-5,13-methano-dibenz[c,g] azonin-7(5H)-one in place of 5,13 - dihydro-6-methyl-5,13-methano-dibenz-[c,g]azonin-7(5H)-one, there is obtained 10-chloro-5,13-dihydro-6-methyl-5,13-methano-5H-dibenz-[c,g]azonine hydrochloride;
5,13-dihydro-6-methyl-5,13-methano-10-trifluoro methyl 5H-dibenz[c,g]azonine hydrochloride; or
5,13-dihydro-6,10-dimethyl-5,13-methano-5H-dibenz-[c,g]azonine hydrochloride.

What is claimed is:
1. A compound of the formula:

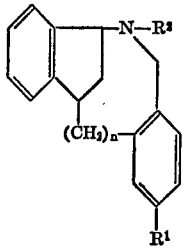

wherein
$n$ represents 0 or 1;
$R^1$ represents hydrogen, halo having an atomic weight of 19 to 36, trifluoromethyl, straight chain lower alkyl, straight chain lower alkoxy; and
$R^2$ represents straight chain lower alkyl;
or a pharmaceutically acceptable acid addition salt therof.

2. The compound of claim 1 which is 5,12-dihydro-6-methyl - 5,12-methano-6H-dibenz[c,f]azocine hydrochloride.

3. A process for preparing a compound of claim 1 which comprises treating a compound of the formula:

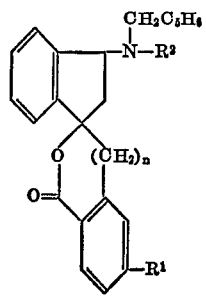

or an acid addition salt thereof, with a reducing agent to obtain a compound of the formula:

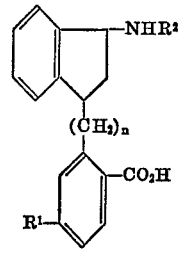

cyclizing the above compound, or an acid addition salt thereof, to prepare an intermediate of the formula:

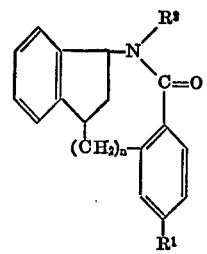

and reducing the latter with lithium aluminum hydride, where $n$, $R^1$ and $R^2$ are as defined in claim 1.

References Cited
FOREIGN PATENTS
1,035,141   7/1958   Germany _____ 260—239 BB

ALTON D. ROLLINS, Primary Examiner

U.S. Cl. X.R.

260—239.3 P, 343.2 R, 343.3, 518 R, 518 A, 519, 559 R, 559 A, 570.9; 424—244